United States Patent
Chang et al.

(10) Patent No.: US 12,471,542 B2
(45) Date of Patent: Nov. 18, 2025

(54) ANTRODIA CINNAMOMEA CULTIVATION METHOD AND POROUS CARRIER FOR CULTIVATING ANTRODIA CINNAMOMEA

(71) Applicants: Jui-Neng Chang, Tainan (TW); Yen-Hung Liu, Kaohsiung (TW)

(72) Inventors: Jui-Neng Chang, Tainan (TW); Yen-Hung Liu, Kaohsiung (TW)

( * ) Notice: Subject to any disclaimer, the term of this patent is extended or adjusted under 35 U.S.C. 154(b) by 663 days.

(21) Appl. No.: 17/793,015

(22) PCT Filed: Oct. 26, 2020

(86) PCT No.: PCT/CN2020/123625
§ 371 (c)(1),
(2) Date: Jul. 14, 2022

(87) PCT Pub. No.: WO2021/143254
PCT Pub. Date: Jul. 22, 2021

(65) Prior Publication Data
US 2023/0047055 A1    Feb. 16, 2023

(30) Foreign Application Priority Data

Jan. 15, 2020 (CN) .......................... 202010042692.1

(51) Int. Cl.
*A01G 18/20* (2018.01)
*A01G 18/60* (2018.01)
*C12N 1/14* (2006.01)

(52) U.S. Cl.
CPC ............. *A01G 18/20* (2018.02); *A01G 18/60* (2018.02); *C12N 1/14* (2013.01)

(58) Field of Classification Search
None
See application file for complete search history.

(56) References Cited

FOREIGN PATENT DOCUMENTS

| CN | 104130074 A | * | 11/2014 |
| CN | 105557294 A | * | 5/2016 |
| JP | H0195781 A | * | 4/1989 |
| WO | WO9015136 | * | 12/1990 |

OTHER PUBLICATIONS

Engmt.Ji, Y. et al. Artificial culture method for Antrodia camphorata by utilizing basswood. Chinese Patent Application Publication No. CN105557294A; Pub. Date: May 11, 2016, pp. 1-12; specif. pp. 1, 2, 7 (Year: 2016).*
EngMT.Sakurai, H. et al. Production of immobilized microorganism. Japanese Patent Application Publication No. JPH0195781A; Pub. Date: Apr. 13, 1989, pp. 1-9; specif. pp. 1, 2, 3, 4, 5, 6 (Year: 1989).*
EngMT. Liu, B. et al. Liquid-state carbon and nitrogen source culture medium of taiwanofungus camphorates and culture method. Chinese Patent Application Publication No. CN104130074A; Pub. Date: Nov. 5, 2014, pp. 1-17; specif. pp. 1, 2 (Year: 2014).*
Lee, M.T. et al. 2018. Evaluation of potential antioxidant and anti-inflammatory effects of Antrodia cinnamomea powder and the underlying molecular mechanisms via Nrf-2 and NF-kB-dominant pathways in broiler chickens. Poultry Science 97: 2419-2434; specif. pp. 2419, 2424 (Year: 2018).*
EFSA. 2006. Use of polyethylene glycol (PEG) as a film coating agent for use in food supplement products. EFSA Journal 414: 1-22; specif. pp. 2, 4, 7 (Year: 2006).*

* cited by examiner

*Primary Examiner* — Adam Weidner
*Assistant Examiner* — Sharon M. Papciak
(74) *Attorney, Agent, or Firm* — Che-Yang Chen; Law Office of Michael Chen

(57) ABSTRACT

An *Antrodia cinnamomea* cultivation method sequentially comprises the following steps: step 1, obtaining a nutrient solution by mixing ingredients thereof, wherein ingredients of the nutrient solution comprises *Cinnamomum kanehirae* extracts, carbon sources and nitrogen sources, the nutrient solution is placed in a porous carrier, the porous carrier has a peripheral surface and multiple micropores recessed into the peripheral surface, the nutrient solution is able to infiltrate into the micropores to form a nutrient layer on the peripheral surface and inner peripheries of the micropores; step 2, performing a membrane treatment on the porous carrier to form a membrane on the nutrient layer; step 3, sterilizing the porous carrier; and step 4, growing *Antrodia cinnamomea* strains on the membrane on the porous carrier, and then placing the porous carrier in a sealed environment for cultivation at constant temperature and humidity.

8 Claims, 6 Drawing Sheets

ANTRODIA CINNAMOMEA CULTIVATION METHOD AND POROUS CARRIER FOR CULTIVATING ANTRODIA CINNAMOMEA

FIELD OF THE INVENTION

The present invention relates to an *Antrodia cinnamomea* cultivation method. More particularly, the present invention relates to an *Antrodia cinnamomea* cultivation method and a porous carrier for cultivating *Antrodia cinnamomea*.

BACKGROUND OF THE INVENTION

In the natural environment, *Antrodia cinnamomea* only grows on the unique species of *Cinnamomum kanehirae* in Taiwan. At present, *Cinnamomum kanehirae* is classified as an endangered conservation plant, and the number is scarce, so that wild *Antrodia cinnamomea* is not easy to obtain. Therefore, artificial cultivation of *Antrodia cinnamomea* is an important research indicator in both academia and industry.

At present, the artificial cultivation methods for *Antrodia cinnamomea* in China can be mainly divided into segment tree cultivation method, liquid fermentation method and solid culture method. As far as the segment tree cultivation method and the liquid fermentation method are concerned, the segment tree cultivation method is to use the log of *Cinnamomum kanehirae* or the segment of other similar species as culture medium, and then to cultivate fruiting bodies of *Antrodia cinnamomea*. The fruiting body of *Antrodia cinnamomea* cultivated by this method has the same or similar active ingredients and efficacy as the fruiting body of wild *Antrodia cinnamomea*. However, the *Cinnamomum kanehirae* log required by the above-mentioned segment tree cultivation method is the first-class conservation tree in Taiwan and cannot be cut down, so the *Cinnamomum kanehirae* log is not easy to obtain. In addition, *Cinnamomum kanehirae* under segment cultivation requires a cultivation period of more than 100 years. The cost of growing *Antrodia cinnamomea* is greatly increased. Therefore, this method is not affordable for ordinary academia or industry.

In addition, the liquid fermentation method performs fermentation culture of *Antrodia cinnamomea* mycelium using liquid medium. This method has a short culture time and a relatively low cost and has high industrial utilization. However, the content of active ingredients in *Antrodia cinnamomea* mycelium cultured by the aforementioned liquid fermentation method is low. Unique triterpenoids in wild *Antrodia cinnamomea* cannot be obtained.

SUMMARY OF THE INVENTION

For solving the above problems, the embodiment of the present invention provides an *Antrodia cinnamomea* cultivation method and a porous carrier for cultivating *Antrodia cinnamomea*. The invention uses the easily obtained porous carrier to replace the *Cinnamomum kanehirae* logs required for traditional segment tree cultivation, thereby reducing the cultivation cost. The nutrient layer and the membrane formed from the porous carrier can promote the growth of *Antrodia cinnamomea*, so that the fruiting body of *Antrodia cinnamomea* cultivated in the present invention contains the active components and efficacy of triterpenoids.

In order to achieve the above purpose, a first embodiment of the present invention provides an *Antrodia cinnamomea* cultivation method which comprises the following steps: step 1, obtaining a nutrient solution by mixing in proportion, wherein ingredients of the nutrient solution comprises *Cinnamomum kanehirae* extracts, carbon sources and nitrogen sources, the nutrient solution is placed in a porous carrier, the porous carrier has a peripheral surface and a plurality of micropores recessed into the peripheral surface, the nutrient solution is able to infiltrate into the micropores to form a nutrient layer on the peripheral surface and inner peripheries of the micropores; step 2, performing a membrane treatment on the porous carrier to form a membrane on the nutrient layer; step 3, sterilizing the porous carrier; and step 4, growing *Antrodia cinnamomea* strains on the membrane on the porous carrier, and then placing the porous carrier in a sealed environment for cultivation at constant temperature and humidity, so that the membrane is able to be decomposed by the *Antrodia cinnamomea* strains and the nutrient layer is able to promote growth of the *Antrodia cinnamomea* strains into an *Antrodia cinnamomea* fruiting body.

A second embodiment of the present invention provides a porous carrier for cultivating *Antrodia cinnamomea*. The porous carrier has a peripheral surface and a plurality of micropores recessed into the peripheral surface. The porous carrier further has a nutrient layer and a membrane. The nutrient layer is formed on the peripheral surface and the inner peripheries of the micropores. The membrane is formed on the nutrient layer and covers the nutrient layer.

Further, in the step 1, the porous carrier is soaked in the nutrient solution so that the micropores is able to absorb the nutrient solution, and the porous carrier is then dried at 35 to 45 degrees so that the nutrient solution is solidified as the nutrient layer formed on the peripheral surface and the inner peripheries of the micropores.

Further, in the step 1, the *Cinnamomum kanehirae* extracts are obtained by homogenizing and extracting *Cinnamomum kanehirae* logs and *Cinnamomum kanehirae* leaves, the carbon sources are glucose and sucrose, and the nitrogen sources are yeast extracts.

Further, the porous carrier is a cube made of non-plastic materials, and the porous carrier comprises one of brick, stone powder compressed block, terracotta tile, pottery clay, porcelain clay and fire brick.

Further, in the step 2, the food additive is polyethylene glycol, the *Antrodia cinnamomea* extracts are obtained by homogenizing and extracting *Antrodia cinnamomea* powder and *Antrodia cinnamomea* mycelium, and the carbohydrate is sucrose or glucose.

Further, in the step 2, the food additive is heated to a liquid and then the *Antrodia cinnamomea* extracts and the carbohydrate are mixed to the liquid to form a coating material, and the coating material is then coated on the nutrient layer of the porous carrier to cool to form the membrane.

Further, in the step 3, the porous carrier is irradiated with gamma rays to sterilize the membrane and the nutrient layer.

Further, in the step 4, the porous carrier is sealed in a growth box, the growth box is made of a transparent material, a fixing frame is arranged in the growth box so that the porous carrier can be fixed in a high location, and the growth box is filled with sterile water and without contacting the porous carrier, wherein, the internal temperature of the growth box is maintained at 25 degrees to 28 degrees and the humidity of the growth box is maintained at 60% to 80%.

Hence, the *Antrodia cinnamomea* cultivation method in the present invention is to form the nutrient layer and the membrane on the porous carrier, grow *Antrodia cinnamomea* strains on the peripheral surface and in the micropores of the porous carrier, and subsequently place the porous carrier in a sealed environment for constant temperature and humidity cultivation to simulate the growth environment of *Antrodia cinnamomea*. The ingredients of the nutrient layer and the membrane can promote the growth of the *Antrodia cinnamomea* strains. The *Antrodia cinnamomea* fruiting body cultivated according to the present invention contains the active components and efficacy of triterpenoids, so as to achieve the purpose of effectively cultivating *Antrodia cinnamomea*.

BRIEF DESCRIPTION OF THE DRAWINGS

FIG. 3b is a partially enlarged view of part A of FIG. 3a.

DETAILED DESCRIPTION OF THE PREFERRED EMBODIMENTS

In order to facilitate the description of the central idea of the present invention in the columns of the above-mentioned summary of the present invention, it is now expressed with specific embodiments.

Figure 1:
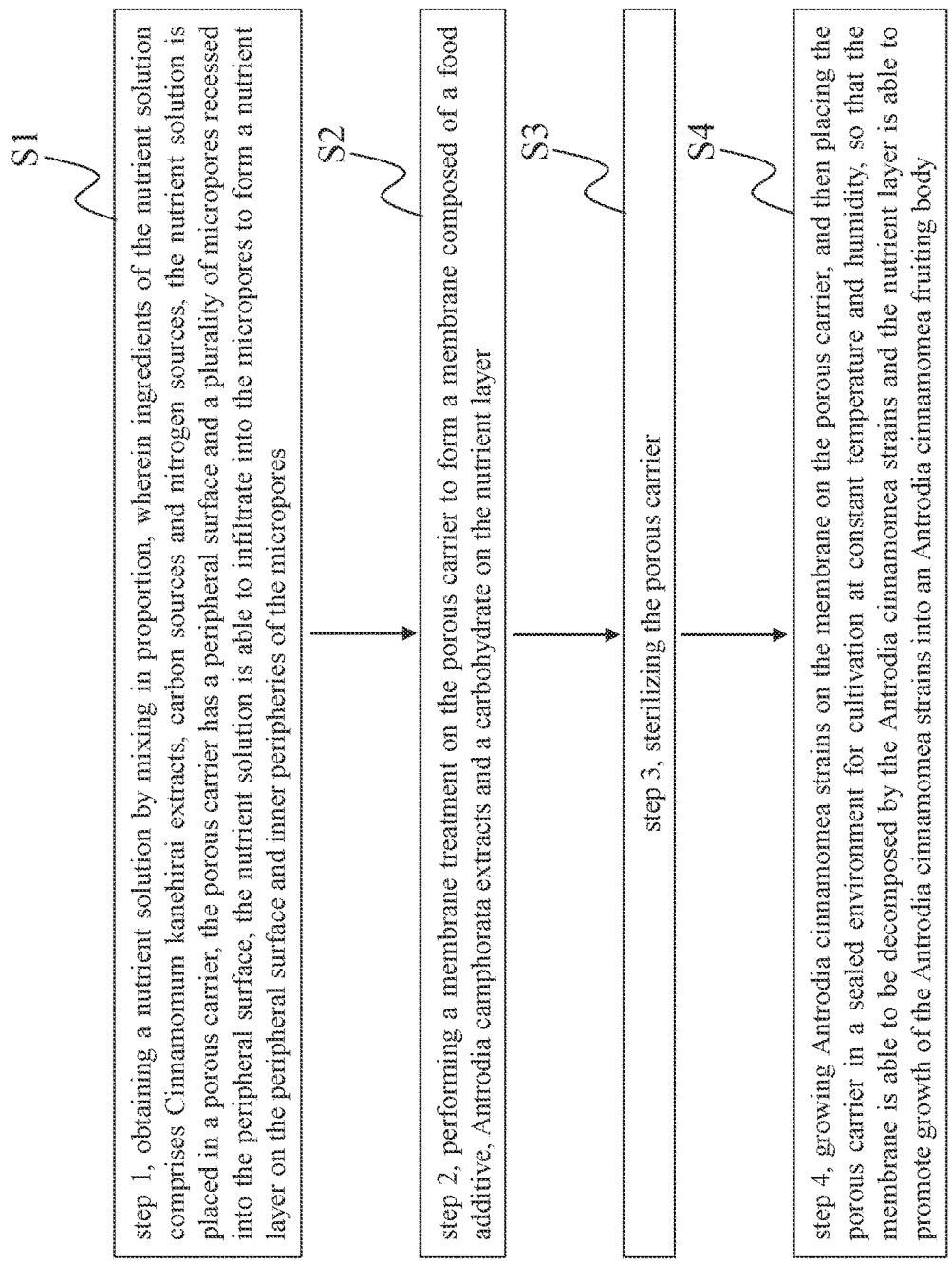
FIG. 1 is a flow chart of steps of an embodiment of the present invention.
Figure 2:
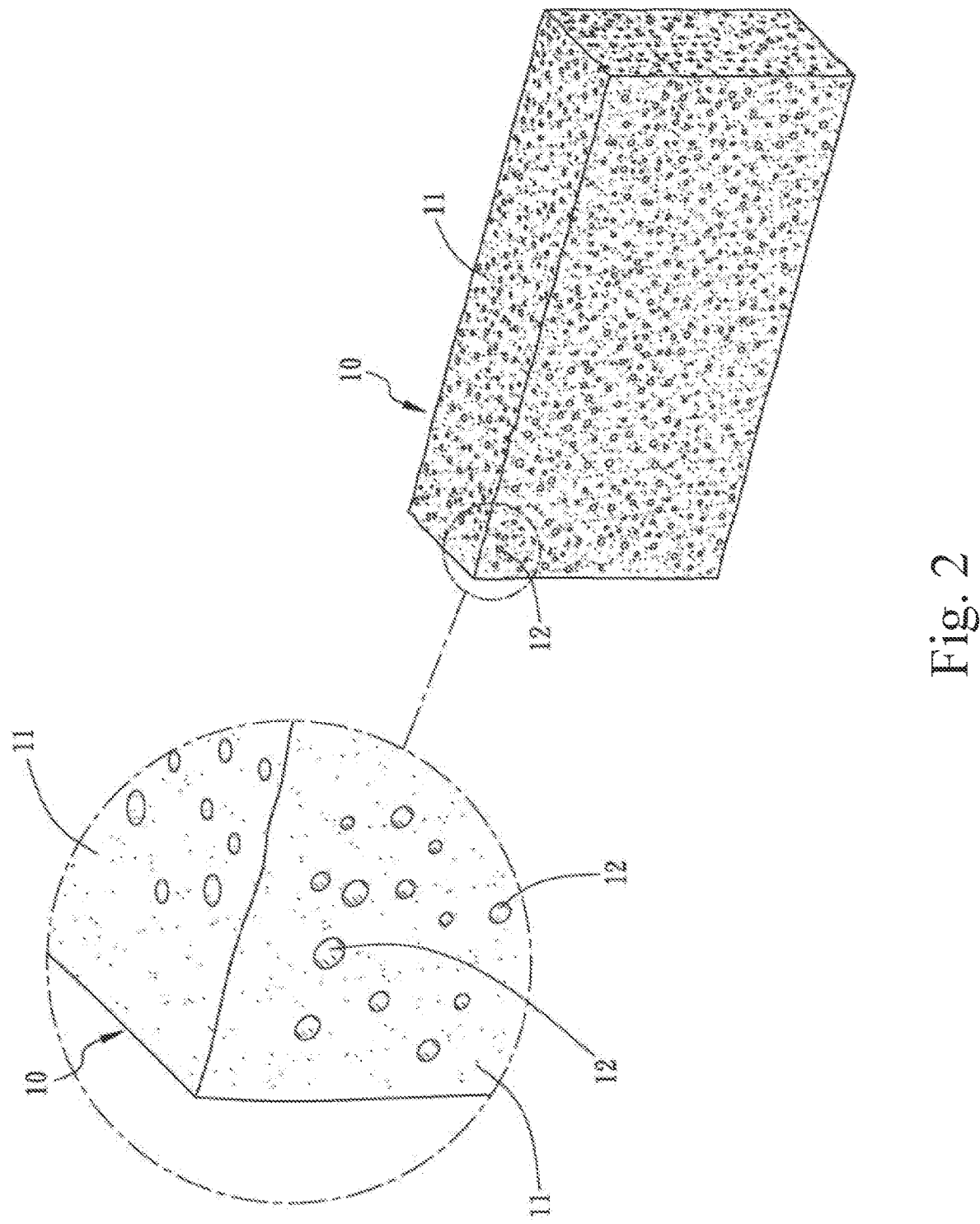
FIG. 2 is a three-dimensional schematic diagram of a porous carrier in the embodiment of the present invention.

Refer to FIG. 1 to FIG. 5. An *Antrodia cinnamomea* cultivation method and a porous carrier 10 for cultivating *Antrodia cinnamomea* are provided in an embodiment of the present invention. The porous carrier 10 is a cube made of non-plastic materials. In a preferred embodiment, the porous carrier 10 one of brick, stone powder compressed block, terracotta tile, pottery clay, porcelain clay and fire brick. As shown in FIG. 2, the embodiment of the present invention is described with a fire brick. The porous carrier 10 has a peripheral surface 11 and a number of micropores 12 recessed into the peripheral surface 11. The micropores 12 are distributed inside the porous carrier 10 and connected. In addition, the porous carrier 10 forms a nutrient layer 13 and a membrane 14. The nutrient layer 13 is formed on the peripheral surface 11 of the porous carrier 10 and the inner peripheries of the micropores 12. The membrane 14 is formed on the nutrient layer 13.

Refer to FIG. 1 to FIG. 5. The *Antrodia cinnamomea* cultivation method of the present invention uses the aforementioned porous carrier 10 to carry out cultivation of the *Antrodia cinnamomea*. The *Antrodia cinnamomea* cultivation method comprises the following steps.

Step 1 (S1) is obtaining a nutrient solution by mixing in proportion. Ingredients of the nutrient solution comprises *Cinnamomum kanehirae* extracts, carbon sources and nitrogen sources. In a preferred embodiment, the *Cinnamomum kanehirae* extracts are obtained by homogenizing and extracting *Cinnamomum kanehirae* logs and *Cinnamomum kanehirae* leaves and have the effect of promoting the growth of *Antrodia cinnamomea*. The carbon sources are glucose and sucrose. The nitrogen sources are yeast extracts. Then, the nutrient solution is placed in the porous carrier 10. For example, the porous carrier 10 in the present invention is soaked in the nutrient solution so that the nutrient solution can infiltrate into the micropores 12 of the porous carrier 10. The moist porous carrier 10 is then dried at 35 to 45 degrees to prevent the composition of nutrient solution from deteriorating and to cause the nutrient solution to be solidified as the nutrient layer 13 formed on the peripheral surface 11 of the porous carrier 10 and the inner peripheries of the micropores 12.

Figure 3A:
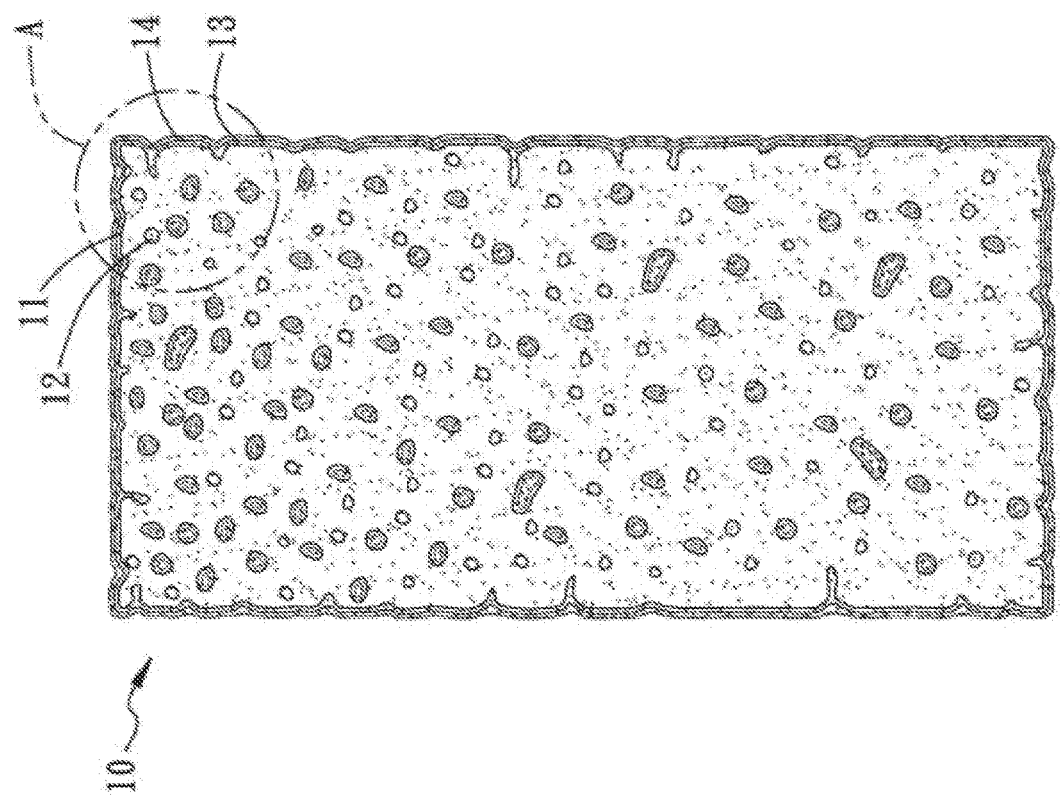
FIG. 3a is a schematic cross-sectional view of the embodiment of the present invention.
Figure 3B:
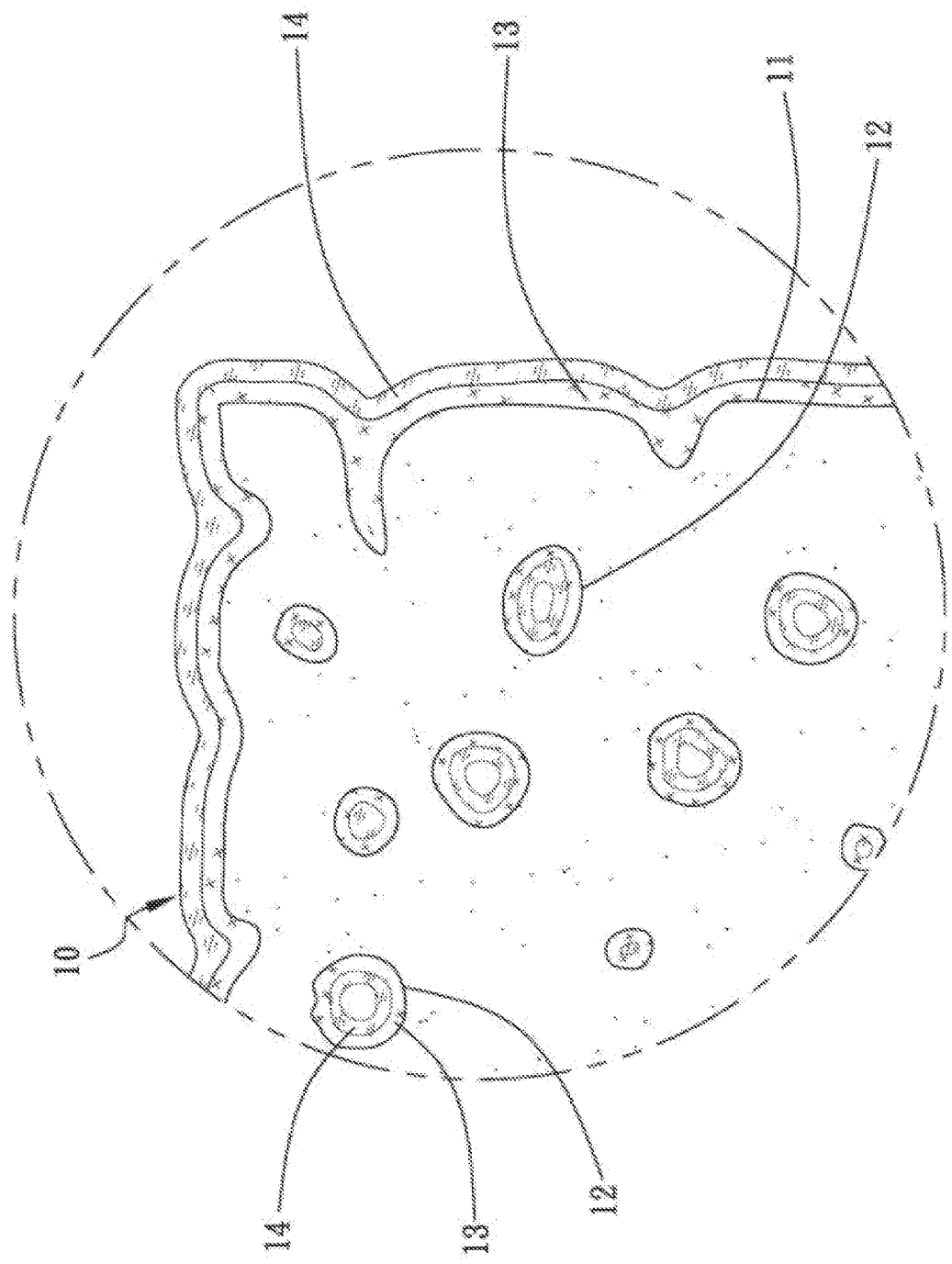

Step 2 (S2) then is performing a membrane treatment on the porous carrier 10 to form the membrane 14 on the nutrient layer 13. The membrane 14 is composed of a food additive, *Antrodia cinnamomea* extracts and a carbohydrate. In a preferred embodiment, the food additive is polyethylene glycol (PEG), the *Antrodia cinnamomea* extracts are obtained by homogenizing and extracting *Antrodia cinnamomea* powder and *Antrodia cinnamomea* mycelium, and the carbohydrate is sucrose or glucose. The implementation of the membrane 14 is the food additive is heated to a liquid first, then the *Antrodia cinnamomea* extracts and the carbohydrate are mixed to the liquid to form a coating material, and the coating material is then coated on the nutrient layer 13 of the porous carrier 10. It makes the coating material cool down on the peripheral surface 11 of the porous carrier 10 and the nutrient layer 13 of the micropores 12 to form the membrane 14, so that the membrane 14 covers the nutrient layer 13. This has the effect of blocking the contact of nutrient layer 13 with the outside world, as shown in FIG. 3a and FIG. 3b.

Step 3 (S3) is: sterilizing the porous carrier 10. In a preferred embodiment, the porous carrier 10 is irradiated with gamma rays to perform an irradiation sterilization on the membrane 14 and the nutrient layer 13 on the porous carrier 10.

Figure 4:
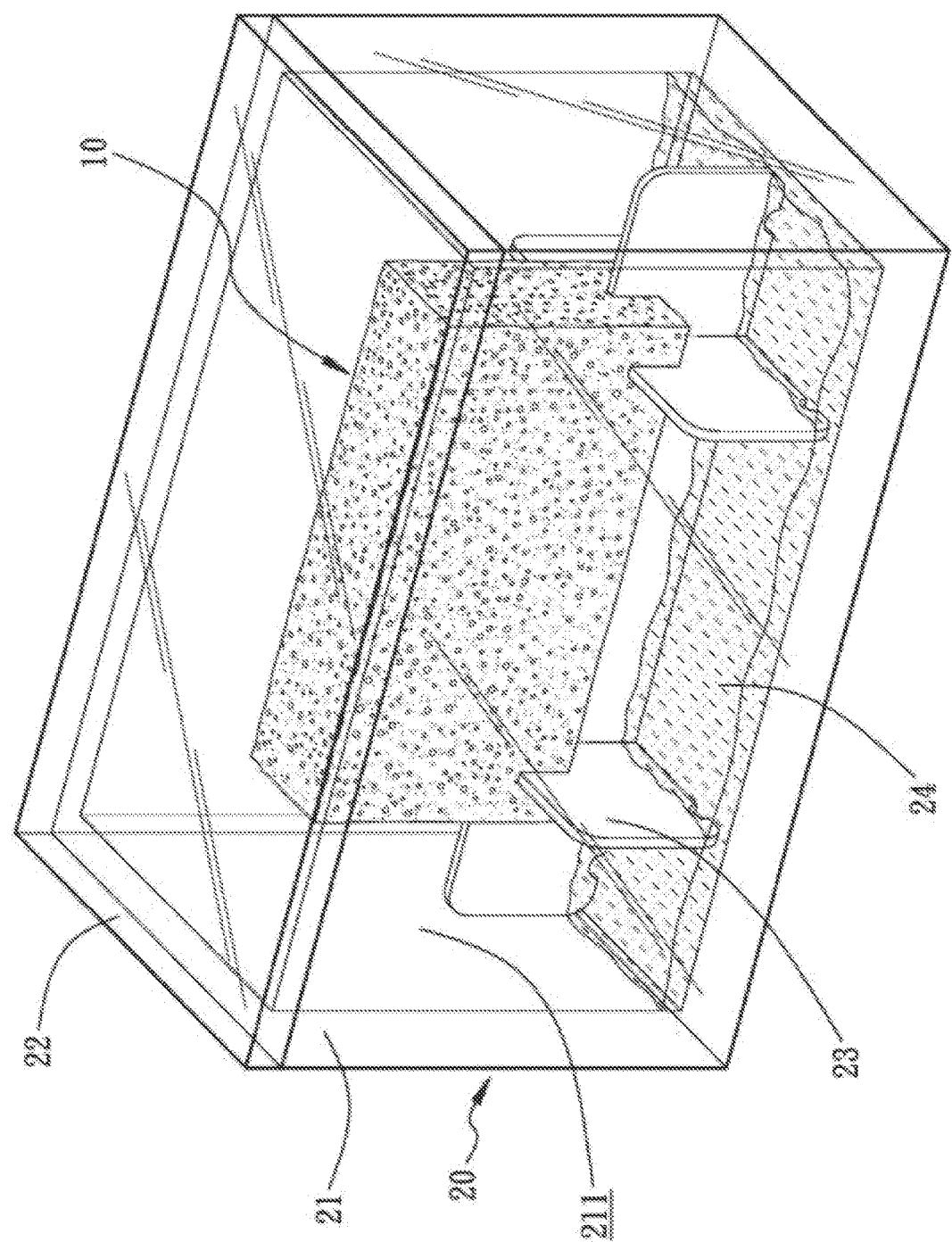
FIG. 4 is an implementation schematic diagram of the embodiment of the present invention.

Step 4 (S4) is, at last, growing *Antrodia cinnamomea* strains on the membrane 14 on the peripheral surface 11 and the micropores 12 of the porous carrier 10, and then placing the porous carrier 10 in a sealed environment for cultivation at constant temperature and humidity, so that the membrane 14 is able to be decomposed by the *Antrodia cinnamomea* strains and the nutrient layer 13 is able to promote growth of the *Antrodia cinnamomea* strains into an *Antrodia cinnamomea* fruiting body 30. In a preferred embodiment, as shown in FIG. 4, the porous carrier 10 is sealed in a growth box 20. The growth box 20 includes a container 21 and an external cover 22. The container 21 has an accommodation space 211. The external cover 22 covers an open of the container 21 so that the accommodation space 211 is in a sealed environment. In addition, the growth box 20 has a fixing frame 23 arranged in the container 21. The fixing frame 23 can help the porous carrier 10 being fixed in a high location. Meanwhile, the growth box 20 is filled with sterile water 24 in the container 21 and without contacting the porous carrier 10. The growth box 20 can be sealed to keep humidity. Lighting is avoided during the cultivation. The internal temperature of the growth box 20 is maintained at 25 degrees to 28 degrees and the humidity of the growth box 20 is maintained at 60% to 80% to simulate the growth environment of *Antrodia cinnamomea*. The ingredients of the nutrient layer 13 and the membrane 14 formed from the porous carrier 10 can promote the growth of the *Antrodia cinnamomea* strains, and the content of the ingredients of the nutrient layer 13 on the inner peripheries of the micropores 12 is more than that on the peripheral surface 11. Therefore, *Antrodia cinnamomea* strains can grow from the micropores 12 of the porous carrier 10, along the surrounding peripheral surface 11.

Figure 5:
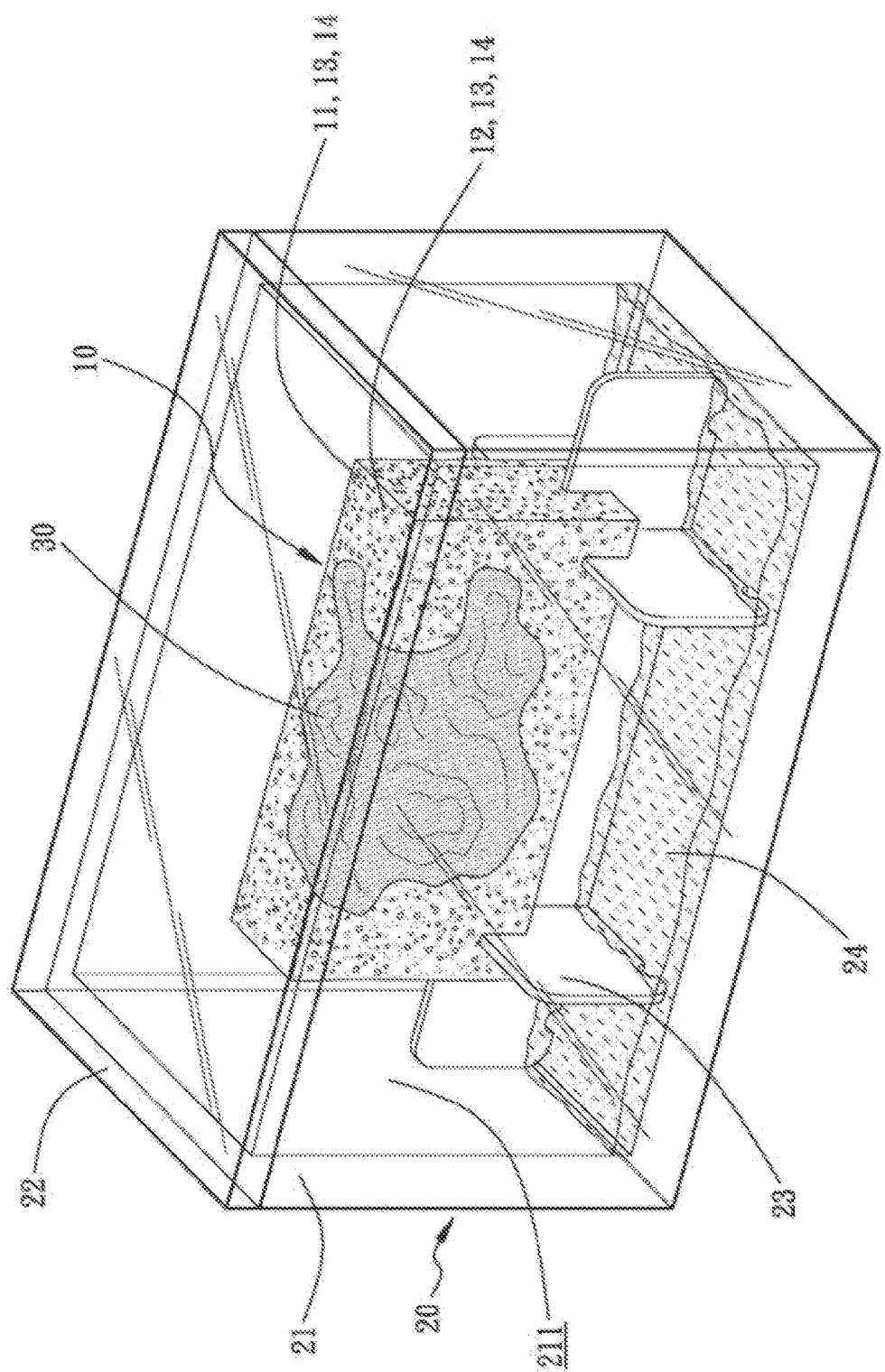
FIG. 5 is a growth state schematic diagram of a fruiting body of *Antrodia cinnamomea* in the embodiment of the present invention.

The growth box 20 is the present invention is made of a transparent material. Users can directly observe the growth of the *Antrodia cinnamomea* strains through the growth box 20, and regularly use a syringe to supplement the nutrient solution to the porous carrier 10 in an appropriate amount to provide the nutrients needed for the growth of the *Antrodia cinnamomea* strains. It is worth mentioning that it was found by the present invention that after 3 months of observation, the peripheral surface 11 and the micropores 12 of the porous carrier 10 can obviously grow the *Antrodia cinnamomea* strains. After another 8 months of observation, it was found that the peripheral surface 11 of the porous carrier 10 did grow *Antrodia cinnamomea* fruiting bodies 30, as shown in FIG. 5.

Hence, the *Antrodia cinnamomea* cultivation method in the present invention is to form the nutrient layer 13 and the membrane 14 on the porous carrier 10, grow the *Antrodia cinnamomea* strains on the peripheral surface 11 and the micropores 12 of the porous carrier 10, and subsequently place the porous carrier 10 in a sealed environment for constant temperature and humidity cultivation to simulate the growth environment of *Antrodia cinnamomea*. The ingredients of the nutrient layer 13 and the membrane 14 can promote the growth of the *Antrodia cinnamomea* strains. The *Antrodia cinnamomea* fruiting body 30 cultivated according to the present invention contains the active components and efficacy of triterpenoids, so as to achieve the purpose of effectively cultivating *Antrodia cinnamomea*.

Meanwhile, the present invention uses the easily obtained porous carrier 10 to replace the *Cinnamomum kanehirae* logs required for traditional segment tree cultivation, thereby reducing the cultivation cost. The *Antrodia cinnamomea* cultivation method of the present invention can be provided to general academia and industry for research and use.

The embodiments of the present invention are disclosed as above but are not intended to limit the present invention. Those of ordinary skill in the technical field to which the present invention belongs, without departing from the spirit and scope of the present invention, can make various changes and modifications. Therefore, the scope of protection of the present invention should be determined by the scope of claims of the patent application.

What is claimed is:

1. An *Antrodia cinnamomea* cultivation method, characterized in that it comprises the following steps: step 1, obtaining a nutrient solution by mixing ingredients thereof, wherein ingredients of the nutrient solution comprises *Cinnamomum kanehirae* extracts, carbon sources and nitrogen sources, the nutrient solution is placed in a porous carrier, the porous carrier has a peripheral surface and a plurality of micropores recessed into the peripheral surface, the nutrient solution infiltrates into the micropores to form a nutrient layer on the peripheral surface and inner peripheries of the micropores; step 2, performing a membrane treatment on the porous carrier to form a membrane composed of a food additive, *Antrodia cinnamomea* extracts and a carbohydrate on the nutrient layer; step 3, sterilizing the porous carrier; and step 4, growing *Antrodia cinnamomea* strains on the membrane on the porous carrier, and then placing the porous carrier in a sealed environment for cultivation at constant temperature and humidity, so that the membrane is decomposed by the *Antrodia cinnamomea* strains and the nutrient layer promotes growth of the *Antrodia cinnamomea* strains into *Antrodia cinnamomea* fruiting bodies.

2. The *Antrodia cinnamomea* cultivation method according to claim 1, characterized in that in the step 1, the porous carrier is soaked in the nutrient solution so that the micropores absorb the nutrient solution, and the porous carrier is then dried at 35 to 45 degrees Celsius so that the nutrient solution is solidified as the nutrient layer formed on the peripheral surface and the inner peripheries of the micropores.

3. The *Antrodia cinnamomea* cultivation method according to claim 2, characterized in that in the step 1, the *Cinnamomum kanehirae* extracts are obtained by homogenizing and extracting *Cinnamomum kanehirae* logs and *Cinnamomum kanehirae* leaves, the carbon sources are glucose and sucrose, and the nitrogen sources are yeast extracts.

4. The *Antrodia cinnamomea* cultivation method according to claim 2, characterized in that the porous carrier is a cube made of non-plastic materials, and the porous carrier comprises one of brick, stone powder compressed block, terracotta tile, pottery clay, porcelain clay or fire brick.

5. The *Antrodia cinnamomea* cultivation method according to claim 2, characterized in that in the step 2, the food additive is polyethylene glycol, the *Antrodia cinnamomea* extracts are obtained by homogenizing and extracting *Antrodia cinnamomea* powder and *Antrodia cinnamomea* mycelium, and the carbohydrate is sucrose or glucose.

6. The *Antrodia cinnamomea* cultivation method according to claim 5, characterized in that in the step 2, the food additive is heated to a liquid and then the *Antrodia cinnamomea* extracts and the carbohydrate are mixed to the liquid to form a coating material, and the coating material is then coated on the nutrient layer of the porous carrier to cool to form the membrane.

7. The *Antrodia cinnamomea* cultivation method according to claim 1, characterized in that in the step 3, the porous carrier is irradiated with gamma rays to sterilize the membrane and the nutrient layer.

8. The *Antrodia cinnamomea* cultivation method according to claim 1, characterized in that in the step 4, the porous carrier is sealed in a growth box, the growth box is made of a transparent material, a fixing frame is arranged in the growth box so that the porous carrier can be fixed in a high location, and the growth box is filled with sterile water and without contacting the porous carrier, wherein, the internal temperature of the growth box is maintained at 25 degrees Celsius to 28 degrees Celsius and the humidity of the growth box is maintained at 60% to 80%, wherein the high location is where the porous carrier contacts no sterile water.

\* \* \* \* \*